US012341237B2

(12) United States Patent
Enkhbayar et al.

(10) Patent No.: US 12,341,237 B2
(45) Date of Patent: Jun. 24, 2025

(54) MULTI-BAND BASE STATION ANTENNA HAVING IMPROVED ISOLATION CHARACTERISTICS

(71) Applicant: ACE TECHNOLOGIES CORPORATION, Incheon (KR)

(72) Inventors: Bayanmunkh Enkhbayar, Incheon (KR); Ho-Yong Kim, Incheon (KR); Nyambayar Jargalsaikhan, Incheon (KR); Muhammad Sajjad Ahmad, Incheon (KR)

(73) Assignee: ACE TECHNOLOGIES CORPORATION, Incheon (KR)

( * ) Notice: Subject to any disclaimer, the term of this patent is extended or adjusted under 35 U.S.C. 154(b) by 180 days.

(21) Appl. No.: 18/257,567

(22) PCT Filed: Dec. 6, 2021

(86) PCT No.: PCT/KR2021/018348

§ 371 (c)(1),
(2) Date: Jun. 14, 2023

(87) PCT Pub. No.: WO2022/131648

PCT Pub. Date: Jun. 23, 2022

(65) Prior Publication Data

US 2024/0113418 A1 Apr. 4, 2024

(30) Foreign Application Priority Data

Dec. 15, 2020 (KR) ........................ 10-2020-0175182

(51) Int. Cl.

*H01Q 5/48* (2015.01)
*H01Q 1/24* (2006.01)
*H01Q 1/52* (2006.01)
*H01Q 5/42* (2015.01)
(Continued)

(52) U.S. Cl.

CPC ............. *H01Q 1/246* (2013.01); *H01Q 1/521* (2013.01); *H01Q 5/42* (2015.01); *H01Q 9/16* (2013.01); *H01Q 15/14* (2013.01)

(58) Field of Classification Search

CPC .......... H01Q 1/246; H01Q 1/24; H01Q 9/285; H01Q 9/0407; H01Q 5/48; H01Q 5/50; H01Q 19/108

See application file for complete search history.

(56) References Cited

U.S. PATENT DOCUMENTS 10,498,035 B2 * 12/2019 Isik ........................ H01Q 1/523
2018/0254544 A1 * 9/2018 Lee ........................ H01Q 19/10
(Continued)

FOREIGN PATENT DOCUMENTS

CN 107808998 A 3/2018
KR 10-2008-0033660 A 4/2008
(Continued)

OTHER PUBLICATIONS

International Search Report issued from PCT International Application No. PCT/KR2021/018348 issued on Mar. 21, 2022.
(Continued)

*Primary Examiner* — Awat M Salih

(57) ABSTRACT

A multi-band base station antenna comprises: a reflector; a plurality of high-band radiators arranged on the reflector; and a plurality of low-band radiators arranged on the reflector. Each of the plurality of low-band radiators comprises: a radiation substrate; a first dipole radiator including a first+ dipole arm and a first−dipole arm formed on the radiation substrate; a second dipole radiator including a second+ dipole arm and a second−dipole arm formed on the radiation substrate; and a metal coupler coupled to the lower portion of the radiation substrate. The metal coupler comprises: a first coupling patch located below the first+dipole arm; a second coupling patch located below the first−dipole arm; a
(Continued)

third coupling patch located below the second+dipole arm; and a fourth coupling patch located below the second−dipole arm.

13 Claims, 7 Drawing Sheets

(51) Int. Cl.
*H01Q 9/16* (2006.01)
*H01Q 15/14* (2006.01)

(56) References Cited

U.S. PATENT DOCUMENTS

2019/0173186 A1* 6/2019 Farzaneh ............... H01Q 21/26
2020/0067205 A1 2/2020 Segador et al.
2022/0190487 A1* 6/2022 Sun ...................... H01Q 21/062
2023/0017375 A1* 1/2023 Wu .......................... H01Q 5/42

FOREIGN PATENT DOCUMENTS

KR 10-1484034 B1 1/2015
KR 10-1524528 B1 6/2015
KR 10-2018-0106615 A 10/2017

OTHER PUBLICATIONS

Written Opinion of the International Searching Authoriity of PCT/KR2021/018348 issued on Mar. 21, 2022.

* cited by examiner

MULTI-BAND BASE STATION ANTENNA HAVING IMPROVED ISOLATION CHARACTERISTICS

CROSS-REFERENCE TO RELATED APPLICATIONS

This application is a National Stage Entry of PCT International Application No. PCT/KR2021/018348, which was filed on Dec. 6, 2021, and which claims priority from Korean Patent Application No. 10-2020-0175182 filed on Dec. 15, 2020. The entire contents of the aforementioned patent applications are incorporated herein by reference.

BACKGROUND

1. Technical Field

The present disclosure relates to a base station antenna, and more particularly, to a multi-band base station antenna having improved isolation characteristics.

2. Description of the Related Art

A base station antenna is an antenna installed in a base station to transmit and receive signals with terminals within preset coverage. With the introduction of the 5G system, a relatively high new frequency band is used for communication, and multi-band radiation characteristics that can cover it are required for base station antennas, and for this reason, a plurality of radiators radiating in different frequency bands are disposed together in one housing (radome) in the base station antenna.

FIG. 1 shows a structure of a conventional multi-band base station antenna.

Referring to FIG. 1, a conventional multi-band base station antenna includes a reflector 100, a plurality of low-band radiators 110 and a plurality of high-band radiators 120.

The low-band radiator 110 is a radiator set to radiate a relatively low-band RF signal, and the high-band radiator 120 is a radiator set to radiate a relatively high-band RF signal.

The low-band radiators 110 and the high-band radiators 120 have a predetermined arrangement structure and are coupled on the reflector 100.

The radiation frequency of a base station antenna is determined by the size of a radiator of the antenna.

However, in a conventional base station antenna in which a low-band radiator and a high-band radiator coexist, an RF signal radiated from the high-band radiator is induced to the low-band radiator and re-radiated, resulting in a problem of degrading the performance of the high-band radiator. Accordingly, there is a demand for a radiator having a new structure for suppressing such unnecessary radiation.

SUMMARY

An object of the present disclosure is to propose a structure of a low-band radiator capable of suppressing unnecessary radiation by securing good isolation between a low-band radiator and a high-band radiator in a multi-band base station antenna.

According to an aspect of the present disclosure, conceived to achieve the objective above, a multi-band base station antenna is provided, the antenna comprising: a reflector; a plurality of high-band radiators arranged on the reflector; and a plurality of low-band radiators arranged on the reflector, wherein each of the plurality of low-band radiators comprises: a radiation substrate; a first dipole radiator including a first+dipole arm and a first−dipole arm formed on the radiation substrate; a second dipole radiator including a second+dipole arm and a second−dipole arm formed on the radiation substrate; and a metal coupler coupled to the lower portion of the radiation substrate, and wherein the metal coupler comprises: a first coupling patch located below the first+dipole arm; a second coupling patch located below the first−dipole arm; a third coupling patch located below the second+dipole arm; and a fourth coupling patch located below the second−dipole arm.

The metal coupler may further comprise: a ring-shaped patch portion with a slot formed in the center; and first to fourth supporters vertically protruding from the ring-shaped patch portion, wherein each of the first to fourth coupling patches is coupled to the first to fourth supporters, respectively.

The low-band radiator may further comprise a balun unit that performs impedance matching and provides a feed signal, wherein the balun unit passes through the slot and is coupled to the radiation substrate.

The low-band radiator may further comprise a first+ coupling arm formed on the lower portion of the radiation substrate and formed at a position where electromagnetic coupling is possible with the first+dipole arm; a first− coupling arm formed on the lower portion of the radiation substrate and formed at a position where electromagnetic coupling with the first−dipole arm is possible; a second+ coupling arm formed on the lower portion of the radiation substrate and formed at a position where electromagnetic coupling with the second+dipole arm is possible; and a second−coupling arm formed on the lower portion of the radiation substrate and formed at a position where electromagnetic coupling with the second−dipole arm is possible.

The first+coupling arm, the first−coupling arm, the second+coupling arm and the second−coupling arm extend in a direction rotated by a predetermined angle compared to an extension direction of each of the first+dipole arm, the first−dipole arm, the second+dipole arm and the second−dipole arm.

Preferably, the rotated direction is a direction away from the high-band radiator.

On the upper portion of the radiation substrate, a plurality of auxiliary arms formed between the first dipole radiator and the second dipole radiator are formed.

On the lower portion of the radiation substrate, a plurality of coupling auxiliary arms are formed at positions where electromagnetic coupling with each of the plurality of auxiliary arms is possible.

According to another aspect of the present disclosure, a multi-band base station antenna is provided, the antenna comprising: a reflector; a plurality of high-band radiators arranged on the reflector; and a plurality of low-band radiators arranged on the reflector, wherein each of the plurality of low-band radiators comprises: a radiation substrate; a first dipole radiator including a first+dipole arm and a first−dipole arm formed on the radiation substrate; a second dipole radiator including a second+dipole arm and a second−dipole arm formed on the radiation substrate; a first+coupling arm formed on the lower portion of the radiation substrate and formed at a position where electromagnetic coupling is possible with the first+dipole arm; a first−coupling arm formed on the lower portion of the radiation substrate and formed at a position where electromagnetic coupling with the first−dipole arm is possible; a second+coupling arm formed on the lower portion of the radiation substrate and formed at a position where electromagnetic coupling with the second+dipole arm is possible; and a second−coupling arm formed on the lower portion of the radiation substrate and formed at a position where electromagnetic coupling with the second−dipole arm is possible, and wherein the first+coupling arm, the first−coupling arm, the second+coupling arm and the second−coupling arm extend in a direction rotated by a predetermined angle compared to an extension direction of each of the first+dipole arm, the first−dipole arm, the second+dipole arm and the second−dipole arm.

The present disclosure has the advantage of being able to secure good isolation between a low-band radiator and a high-band radiator in a multi-band base station antenna, and to secure stable standing wave ratio characteristics.

DETAILED DESCRIPTION

Figure 1:
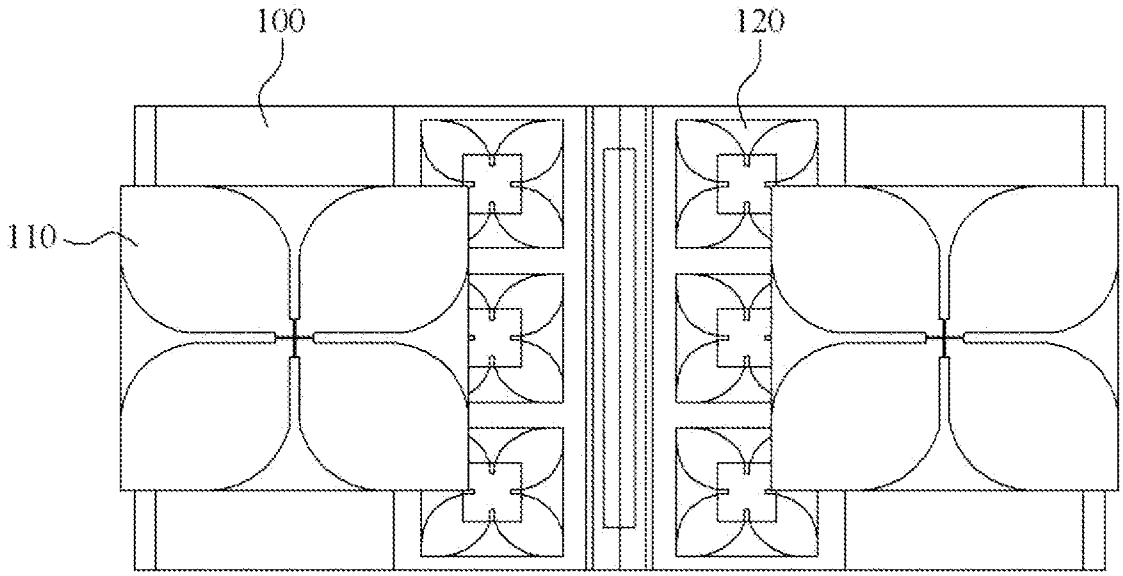
FIG. 1 (Prior Art)
FIG. 1 shows a structure of a conventional multi-band base station antenna.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
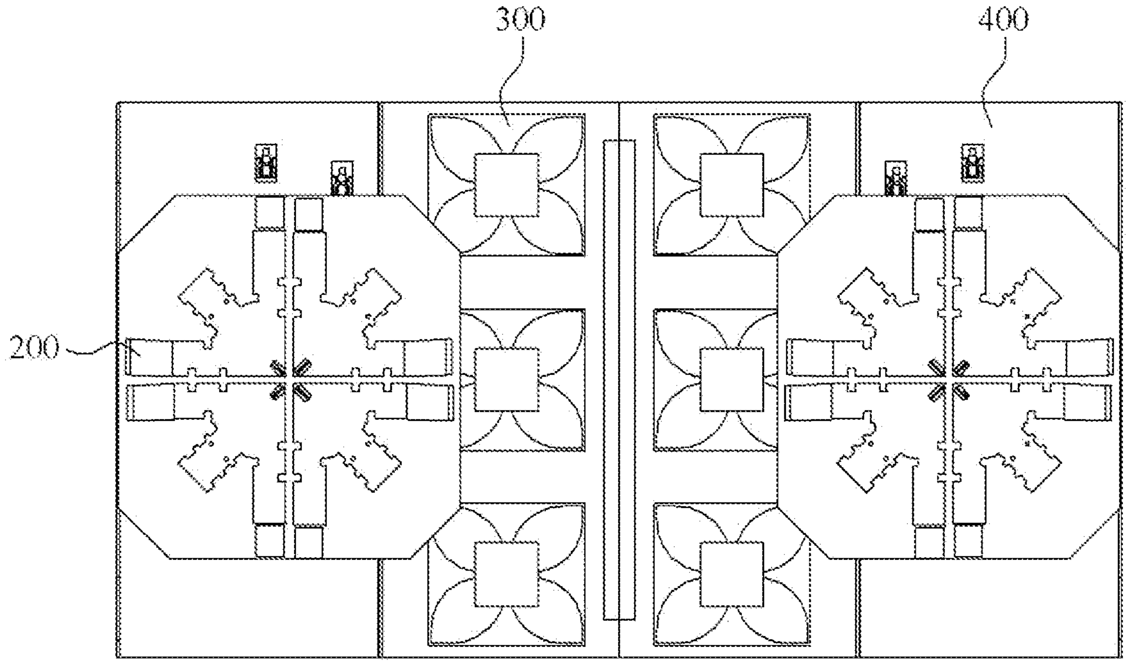
FIG. 2 shows a structure of a multi-band base station antenna device according to an embodiment of the present disclosure.

FIG. 2 shows a structure of a multi-band base station antenna device according to an embodiment of the present disclosure.

Referring to FIG. 2, the multi-band base station antenna according to an embodiment of the present disclosure includes a plurality of low-band radiators 200, a plurality of high-band radiators 300 and a reflector 400.

The plurality of low-band radiators 200 are radiators for radiating relatively low-band RF signals. The low-band radiators 200 are arranged at preset intervals to form an array structure.

Although not shown in FIG. 2, the multi-band base station antenna apparatus according to an embodiment of the present disclosure includes a plurality of phase shifters, and the phase shifters control the phase of the signal fed to each of the low-band radiators 200.

Through phase adjustment of the signal fed to the arrayed low-band radiators 200, a beam direction of a low-band RF signal radiated by the low-band radiators 200 may be adjusted.

The plurality of high-band radiators 300 are radiators for radiating relatively high-band RF signals. The high-band radiators 300 are also arranged at preset intervals to form an array structure.

The plurality of phase shifters also adjust the phase of the signal fed to the high-band radiators 300, and, through phase adjustment, a beam direction of a high-band RF signal radiated by the arrayed high-band radiators 300 may be adjusted.

Although a base station antenna device having radiators for two bands is shown in FIG. 2, it will be apparent to those skilled in the art that radiators for a larger number of bands may be provided.

The plurality of low-band radiators 200 and high-band radiators 300 are formed on the reflector 400. The reflector 400 is made of a metal material and electrically has a ground potential.

The plurality of low-band radiators 200 and high-band radiators 300 may be coupled to the reflector 400 using various coupling methods such as bolting or soldering.

The reflector 400 is a component for controlling the beam direction of the signal so that signals emitted from the plurality of radiators 200 and 300 are radiated toward the front of the reflector, and as the signal is reflected by the reflector 400 having the ground potential, the radiation of the signal toward the rear surface of the reflector 400 is suppressed.

Referring to FIG. 2, in some areas, the low-band radiators 200 and the high-band radiators 300 overlap vertically. The low-band radiators 200 may vertically overlap the high-band radiators 300 while having a higher height than the high-band radiators 300. This overlapping structure is intended to reduce the overall area of the array antenna, and such an overlapping structure is not necessarily required.

Meanwhile, although FIG. 2 shows a case in which two low-band radiators 200 and six high-band radiators 300 are arranged, it will be apparent to those skilled in the art that the number of low-band radiators 200 and high-band radiators 300 can also be changed according to required characteristics and sizes.

Figure 3:
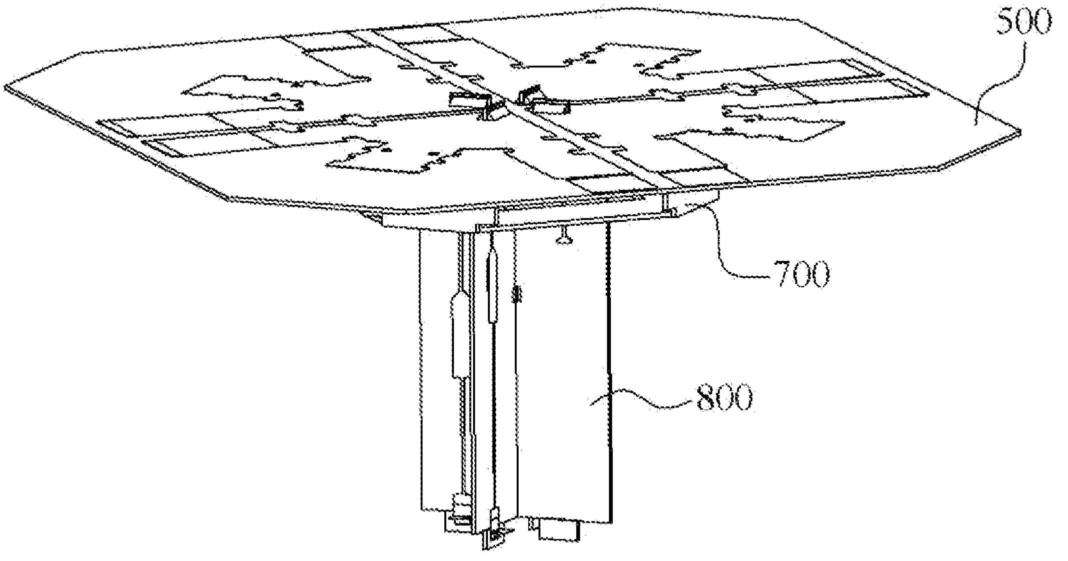
FIG. 3 is a perspective view of a structure of a low-band radiator in a multi-band base station antenna according to an embodiment of the present disclosure as viewed from a first direction.
Figure 4:
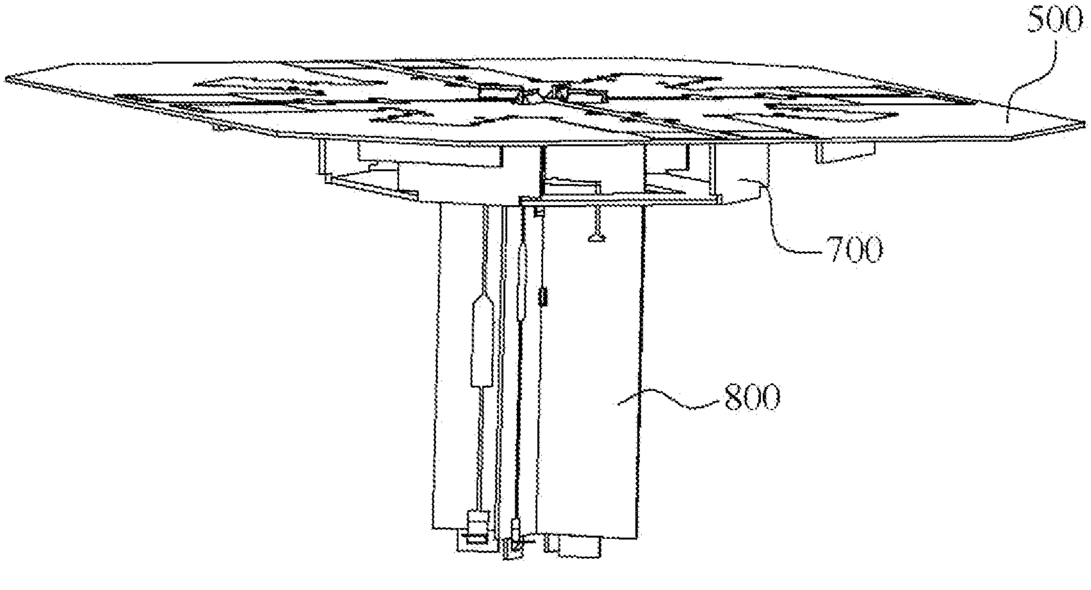
FIG. 4 is a perspective view of a structure of a low-band radiator in a multi-band base station antenna according to an embodiment of the present disclosure as viewed from a second direction.

FIG. 3 is a perspective view of a structure of a low-band radiator in a multi-band base station antenna according to an embodiment of the present disclosure as viewed from a first direction, and FIG. 4 is a perspective view of a structure of a low-band radiator in a multi-band base station antenna according to an embodiment of the present disclosure as viewed from a second direction.

Referring to FIGS. 3 and 4, the low-band radiator according to an embodiment of the present disclosure includes a radiation substrate 500, a balun unit 800 and a metal coupler 700.

The radiation substrate 500 is a substrate on which a radiator is formed, and is a substrate made of a dielectric material. Radiation patterns for radiation are formed on the upper and lower portions of the radiation substrate 500, and detailed structures of the radiation patterns will be described with reference to separate drawings.

The balun unit 800 is coupled to the reflector 400 and has a preset height to perform an impedance matching role. A feed line is coupled to the balun unit 800 to provide a feed signal to radiation patterns formed on upper and lower portions of the radiation substrate 500. For example, the balun unit 800 may have a structure in which two substrates are orthogonally coupled to each other, and a detailed structure of the balun unit 800 will be described with reference to separate drawings.

The metal coupler 700 is coupled to the lower portion of the radiation substrate 500. The metal coupler 700 is an element proposed in the present disclosure in order to suppress signal interference phenomenon that the low-band radiator 200 is subjected to by the high-band radiator 300. The metal coupler 700 serves to secure isolation between the low-band radiator 200 and the high-band radiator 300 and improve the cross polarization ratio of the low-band radiator. A detailed structure of the metal coupler 700 will be described with reference to separate drawings.

Figure 5:
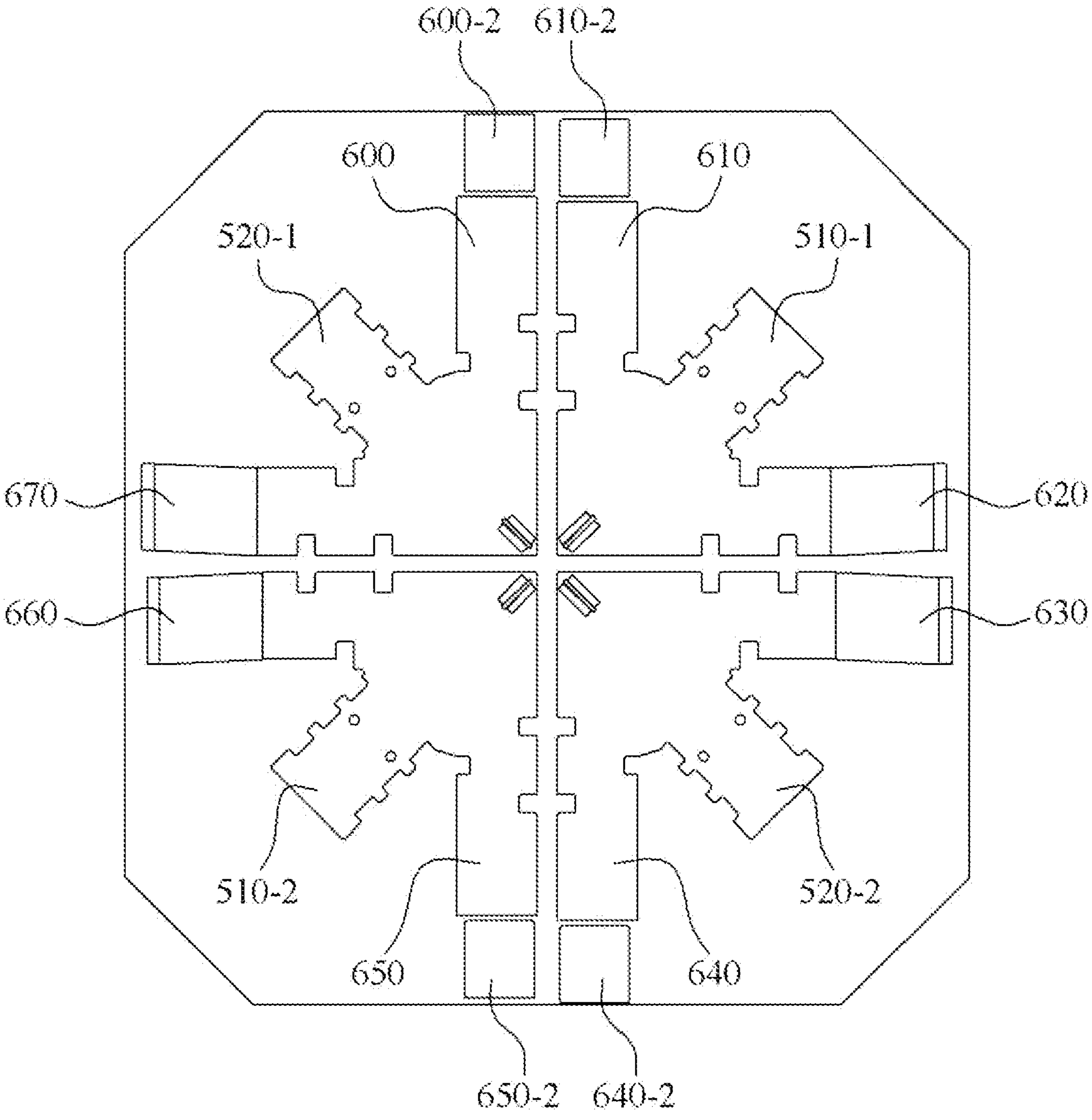
FIG. 5 shows an upper surface of a radiation substrate according to an embodiment of the present disclosure.

FIG. 5 shows an upper surface of a radiation substrate according to an embodiment of the present disclosure.

A radiation pattern is formed on the top of the radiation substrate 500, and the radiation pattern includes: a first dipole radiator including a first+dipole arm 510-1 and a first−dipole arm 510-2; and a second dipole radiator including a second+dipole arm 520-1 and a second−dipole arm 520-2.

The first+dipole arm 510-1 and the first−dipole arm 510-2 operate as the first dipole radiator that receives+power feed and−power feed, respectively, and for example, the first dipole radiator may function as a radiator radiating an RF signal of +45 degree polarization.

The second+dipole arm 520-1 and the second−dipole arm 520-2 operate as the second dipole radiator receiving+power feed and−power feed, respectively, and for example, it may function as a radiator that radiates an RF signal of − 45 degree polarization.

The low-band radiator according to an embodiment of the present disclosure is a radiator set to radiate dual polarization signals of +45 degrees and − 45 degrees, however, it is obvious to those skilled in the art that the case of radiating a signal of a single polarization is also included in the scope of the present disclosure, and such a radiator may include only one dipole radiator.

In general, a radiation pattern of a base station antenna formed on a substrate is formed only on the upper portion of the substrate. However, the low-band radiators according to an embodiment of the present disclosure are formed on both upper and lower portions of a substrate, and a radiation pattern structure formed on the lower portion of the substrate will be described with reference to separate drawings.

The first+dipole arm 510-1 and the first−dipole arm 510-2 are formed at the same angle, and extend in opposite directions at the same angle from the center of the substrate. In FIG. 5, a case is shown in which they extend in the +45 degree direction from the center of the substrate.

Typically, an arm of a dipole radiator has a length of about 0.25λ of the radiation frequency. However, the first+dipole arm 510-1 and the first−dipole arm 510-2 of the present disclosure have a length shorter than 0.25λ. For example, the first+dipole arm 510-1 and the first−dipole arm 510-2 have a length of about 0.2λ.

The second+dipole arm 520-1 and the second−dipole arm 520-2 are formed at the same angle, and extend in opposite directions at the same angle from the center of the substrate. In FIG. 4, a case is shown in which they extend in the − 45 degree direction from the center of the substrate.

The second+dipole arm 520-1 and the second−dipole arm 520-2 also have a length less than 0.25λ, and may be set to have a length of about 0.2λ.

When the length of the dipole arm is 0.2λ, the radiation frequency cannot be properly radiated. Nevertheless, the present disclosure sets the length of the first dipole arms 510-1 and 510-2 and the second dipole arms 520-1 and 520-2 to have a length of 0.2λ, and the required remaining length is compensated by using coupling arms 510-3, 510-4, 520-3 and 520-4 formed on the lower portion of the substrate and described later.

Figure 6:
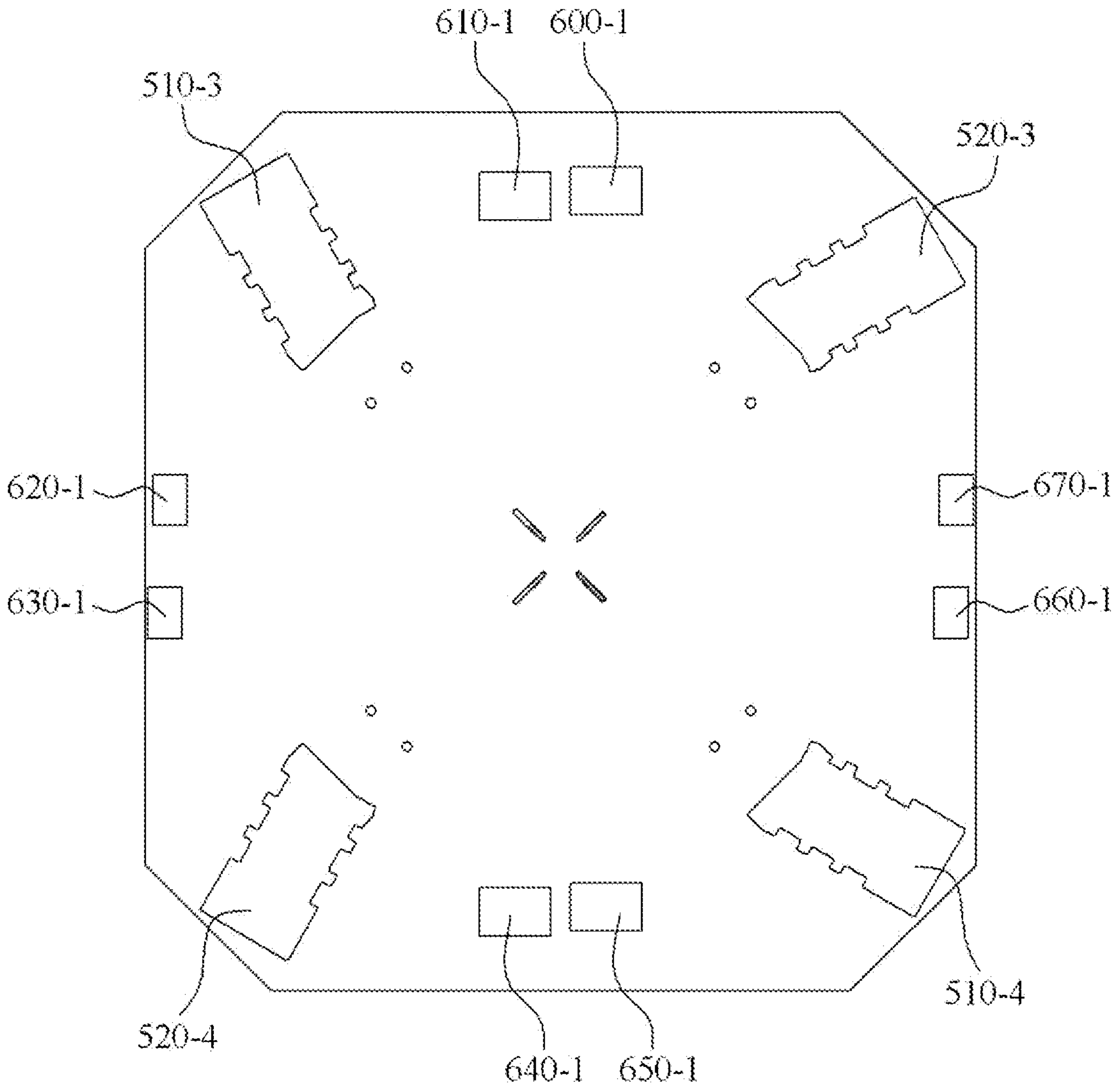
FIG. 6 is a plan view illustrating a structure of a lower portion of a radiation substrate of a low-band radiator in a multi-band base station antenna according to an embodiment of the present disclosure.
Figure 7:
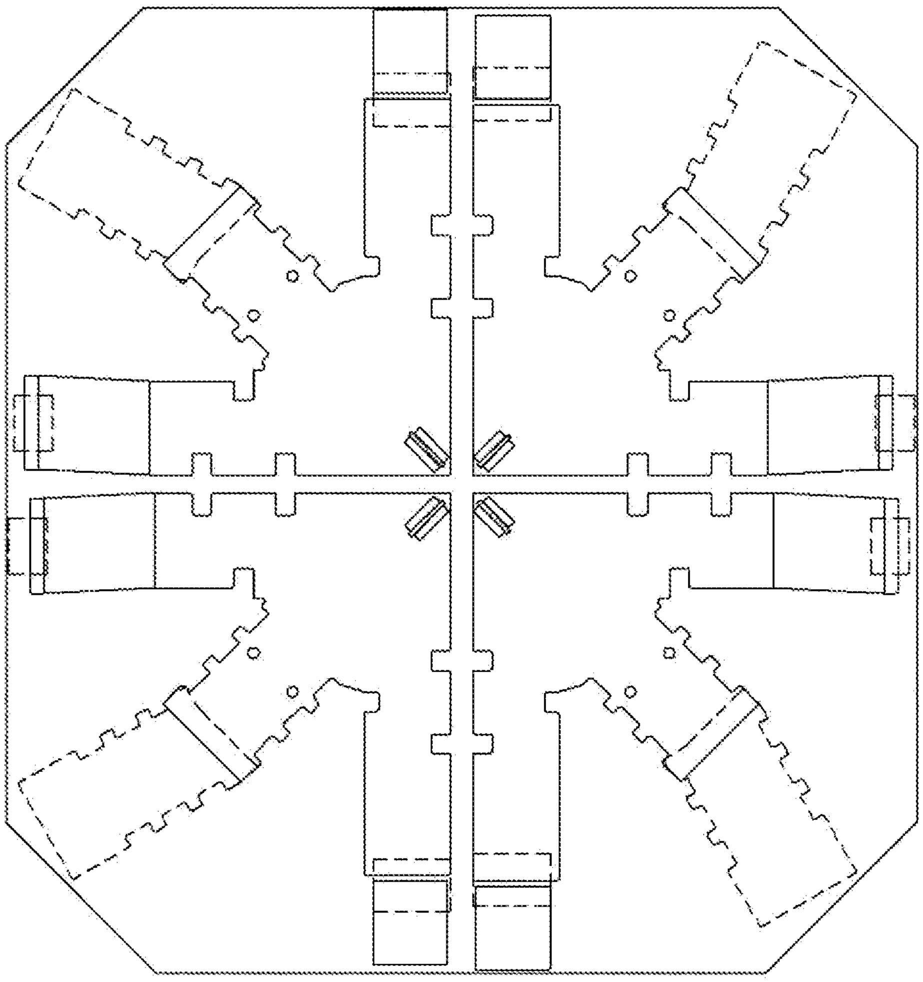
FIG. 7 shows upper and lower portions of a radiation substrate of a low-band radiator in a multi-band base station antenna according to an embodiment of the present disclosure.

FIG. 6 is a plan view illustrating a structure of a lower portion of a radiation substrate of a low-band radiator in a multi-band base station antenna according to an embodiment of the present disclosure, and FIG. 7 shows upper and lower portions of a radiation substrate of a low-band radiator in a multi-band base station antenna according to an embodiment of the present disclosure.

The first+coupling arm 510-3 is an arm for compensating for the remaining length required for the first+dipole arm 510-1, and the first+coupling arm 510-3 is formed on the lower portion of the substrate, and is formed at a position where it can be electromagnetically connected to the first+dipole arm 510-1 through coupling. Through this coupling connection structure, the first+dipole arm 510-1 and the first+coupling arm 510-3 operate as one+dipole arm.

According to an embodiment of the present disclosure, the position of the first+coupling arm 510-3 may be set so that the beginning of the first+coupling arm 510-3 and the end of the first+dipole arm 510-1 vertically match each other.

According to a preferred embodiment of the present disclosure, the first+coupling arm 510-3 may be formed at an angle rotated by a predetermined angle compared to the first+dipole arm 510-1. The first+coupling arm 510-3 may be rotated by a predetermined angle in a direction away from the high-band radiator compared to the first+dipole arm 510-1.

Of course, the first+coupling arm 510-3 may also be formed in the same direction as the first+dipole arm 510-1, and when the first+coupling arm 510-3 is rotated in a direction away from the high-band radiator, better isolation characteristics can be secured.

Since the first+coupling arm 510-3 and the first+dipole arm 510-1 substantially operate as one+dipole arm, the combined length of the first+dipole arm 510-1 and the first+coupling arm 510-3 is set to 0.25λ. For example, when the length of the first+dipole arm 510-1 is 0.2λ, the length of the first+coupling arm 510-3 may be set to 0.05λ.

If the first+dipole arm 510-1 and the first+coupling arm 510-3 partially overlap, the length excluding the overlapped length may be set to be 0.25λ.

The first−coupling arm 510-4 is an arm for compensating for the remaining length required for the first−dipole arm 510-2, and the first−coupling arm 510-4 is also formed on the lower portion of the substrate, and is formed at a position where it can be electromagnetically connected to the first−dipole arm 510-2 through coupling. Through this coupling connection structure, the first−dipole arm 510-2 and the first−coupling arm 510-4 operate as one−dipole arm.

According to an embodiment of the present disclosure, the position of the first−coupling arm 510-4 may be set such that the beginning of the first−coupling arm 510-4 and the end of the first−dipole arm 510-2 coincide with each other. Of course, the position of the first−coupling arm 510-4 may also be set to partially overlap the first−dipole arm 510-2.

As in the case of the first+coupling arm 510-3, the first−coupling arm 510-4 may be formed at an angle rotated by a predetermined angle compared to the first−dipole arm 510-2, and the first−coupling arm 510-4 may be rotated in a direction away from the high-band radiator by a predetermined angle compared to the first−dipole arm 510-2. Of course, the first−coupling arm 510-4 may also be formed at the same angle as the first−dipole arm 510-2.

Since the first−coupling arm 510-4 and the first−dipole arm 510-2 operate as substantially one−dipole arm, the combined length of the first−dipole arm 510-2 and the first−coupling arm 510-4 is also set to 0.25λ.

The second+coupling arm 520-3 and the second−coupling arm 520-4 are also formed on the lower portion of the substrate 500 in the same manner, the second+coupling arm 520-3 and the second+dipole arm 520-1 function as one+dipole radiator, and the second−coupling arm 520-4 and the second−dipole arm 520-2 function as one−dipole radiator.

Referring to FIG. 7, dipole arms formed on the upper portion of the substrate and coupling arms formed on the lower portion of the substrate are shown together, and, through FIG. 7, it can be seen that a dipole arm and a coupling arm function as one dipole radiator through electromagnetic coupling.

This structure of isolating the dipole arms to the upper and lower portions of the substrate is to prevent the RF signal radiated from the high-band radiator from being induced to the low-band radiator and re-radiated, in the base station antenna where the low-band radiator and the high-band radiator coexist. That is, it is a structure for ensuring isolation between the high-band antenna and the low-band antenna, and the high-band signal induced to the low-band radiator is suppressed by the two arms separated vertically. In addition, the dipole arm structure of the present disclosure described above has an effect of improving the standing wave ratio characteristics of the low-band radiator.

Referring back to FIGS. 5 and 6, a plurality of auxiliary arms 600, 610, 620, 630, 640, 650, 660 and 670 are formed. The plurality of auxiliary arms 600, 610, 620, 630, 640, 650, 660 and 670 are formed between the dipole arms 510-1, 510-2, 520-1 and 520-2.

Although, in FIGS. 5 and 6, a case is shown in which two auxiliary arms protrude between each of the dipole arms 510-1, 510-2, 520-1 and 520-2 to form a total of eight auxiliary arms 600, 610, 620, 630, 640, 650, 660 and 670, it will be easily understood by those skilled in the art that the number of auxiliary arms can be changed as needed.

Extending directions of the plurality of auxiliary arms may be parallel to or perpendicular to the arrangement direction of the low-band radiators. For example, a first auxiliary arm 600 and a second auxiliary arm 610 are formed between the first+dipole arm 510-1 and the second+dipole arm 520-1, and the first auxiliary arm 600 and the second auxiliary arm 610 extend in a direction parallel to the arrangement direction of the low-band radiators.

A third auxiliary arm 620 and a fourth auxiliary arm 630 are formed between the first+dipole arm 510-1 and the second−dipole arm 520-2. The third auxiliary arm 620 and the fourth auxiliary arm 630 extend in a direction perpendicular to the arrangement direction of the low-band radiators.

A fifth auxiliary arm 640 and a sixth auxiliary arm 650 are formed between the second−dipole arm 520-2 and the first−dipole arm 510-2. The fifth auxiliary arm 640 and the sixth auxiliary arm 650 extend in a direction parallel to the arrangement direction of the low-band radiators.

A seventh auxiliary arm 660 and an eighth auxiliary arm 670 are formed between the first−dipole arm 510-2 and the second+dipole arm 520-1. The seventh auxiliary arm 660 and the eighth auxiliary arm 670 extend in a direction perpendicular to the arrangement direction of the low-band radiators.

Referring to FIG. 6, on the lower portion of the substrate, coupling auxiliary arms 600-1, 610-1, 620-1, 630-1, 640-1, 650-1, 660-1 and 670-1 associated with each of the auxiliary arms 600, 610, 620, 630, 640, 650, 660 and 670 are formed.

Each of a first coupling auxiliary arm 600-1, a second coupling auxiliary arm 610-1, a fifth coupling auxiliary arm 640-1 and a sixth coupling auxiliary arm 650-1 is formed under the first auxiliary arm 600, the second auxiliary arm 610, the fifth auxiliary arm 640 and the sixth auxiliary arm 650 to generate electromagnetic coupling.

Meanwhile, on the upper portion of the radiation substrate, a first coupling member 600-2, a second coupling member 610-2, a fifth coupling member 640-2 and a sixth coupling member 650-2 are formed spaced apart from the first auxiliary arm 600, the second auxiliary arm 610, the fifth auxiliary arm 640 and the sixth auxiliary arm 650.

Primary coupling occurs between the first auxiliary arm 600 and the first coupling auxiliary arm 600-1 positioned below the first auxiliary arm 600, secondary coupling occurs between the first coupling auxiliary arm 600-1 and the first coupling member 600-2, and the same applies to other auxiliary arms. Since the auxiliary arm is not formed as a single member but is electromagnetically connected through multi-stage coupling, which improves the isolation and reflection loss that deteriorates according to the arrangement interval and reduces the pattern deterioration of the high-band radiating element, it is possible to secure good isolation characteristics and reflection loss characteristics of a low-band radiating element while maintaining a good high-band radiation pattern.

Under the third auxiliary arm 620, the fourth auxiliary arm 630, the seventh auxiliary arm 660 and the eighth auxiliary arm 670, a third coupling auxiliary arm 620-1, a fourth coupling auxiliary arm 630-1, a seventh coupling auxiliary arm 660-1 and an eighth coupling auxiliary arm 670-1 are formed, respectively.

Electromagnetic coupling also occurs between the third coupling auxiliary arm 620-1, the fourth coupling auxiliary arm 630-1, the seventh coupling auxiliary arm 660-1 and the eighth coupling auxiliary arm 670-1 and the associated auxiliary arms.

The auxiliary arms 600, 610, 620, 630, 640, 650, 660 and 670 and the coupling auxiliary arms 600-1, 610-1, 620-1, 630-1, 640-1, 650-1, 660-1 and 670-1 also function as a tuning means to compensate for the change in standing wave characteristics when adjusting the array spacing between low-band radiators.

Figure 8:
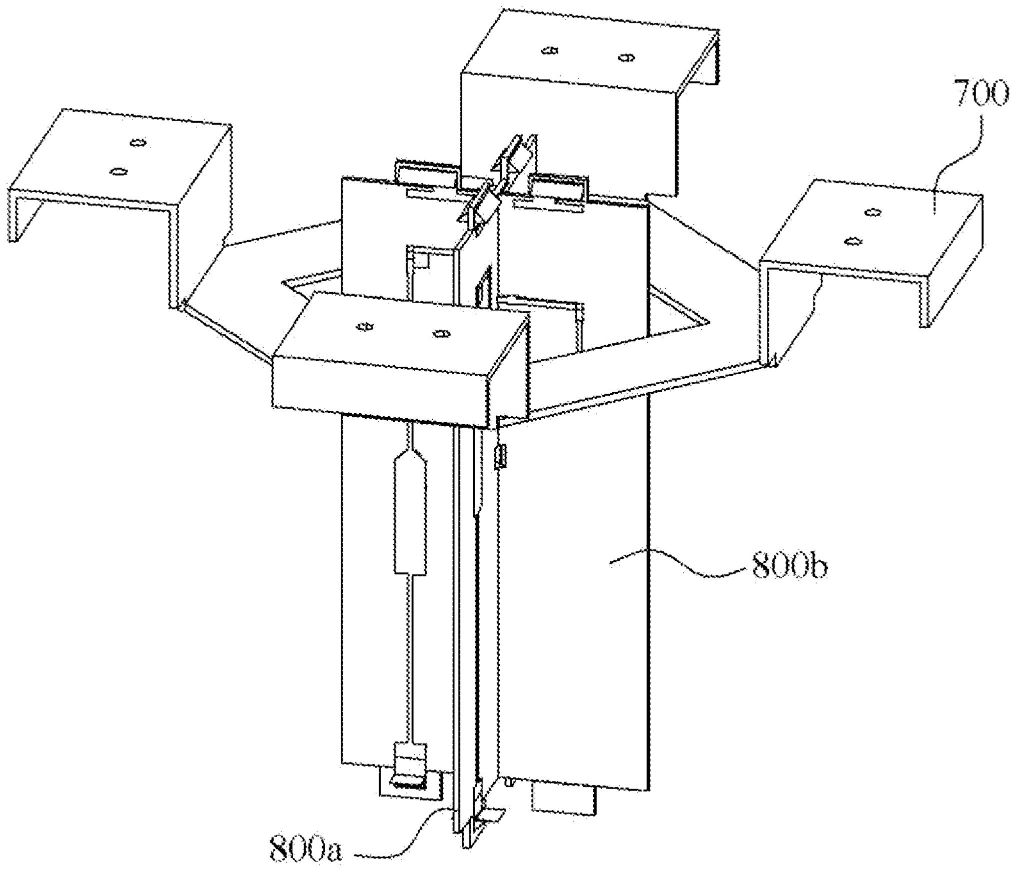
FIG. 8 is a perspective view of a state in which a radiation substrate is removed from a multi-band base station antenna according to an embodiment of the present disclosure.

FIG. 8 is a perspective view of a state in which a radiation substrate is removed from a multi-band base station antenna according to an embodiment of the present disclosure.

Referring to FIG. 8, the balun unit 800 is composed of two substrates 800*a* and 800*b*. A first substrate 800*a* and a second substrate 800*b* are orthogonal to each other, and the two substrates 800*a* and 800*b* standing perpendicular to the reflector function as a balun unit 800 for impedance matching. Lower ends of the two substrates 800*a* and 800*b* are coupled to the reflector, and upper ends are coupled to the radiation substrate 500.

A feed line and a ground line are formed on the two substrates 800*a* and 800*b*, and a feed signal and a ground signal are provided to a plurality of dipole radiators through the feed line. Since a structure for providing a feed signal and a ground signal to dipole radiators is well known, a detailed description thereof will be omitted.

The structure of the balun unit 800 shown in FIGS. 3 and 8 is exemplary, and it will be apparent to those skilled in the art that the balun unit can be formed in various shapes.

Referring to FIG. 8, a metal coupler 700 is coupled to a lower portion of the radiation substrate 500. A plurality of coupling auxiliary arms and a plurality of coupling arms are formed on the lower portion of the radiation substrate 500, but the metal coupler 700 is not in electrical contact with the plurality of coupling auxiliary arms and the plurality of coupling arms. As shown in FIG. 8, since the metal coupler 700 does not contact the substrates 800*a* and 800*b* forming the balun unit 800, the metal coupler 700 is not electrically connected to a signal or ground.

Figure 9:
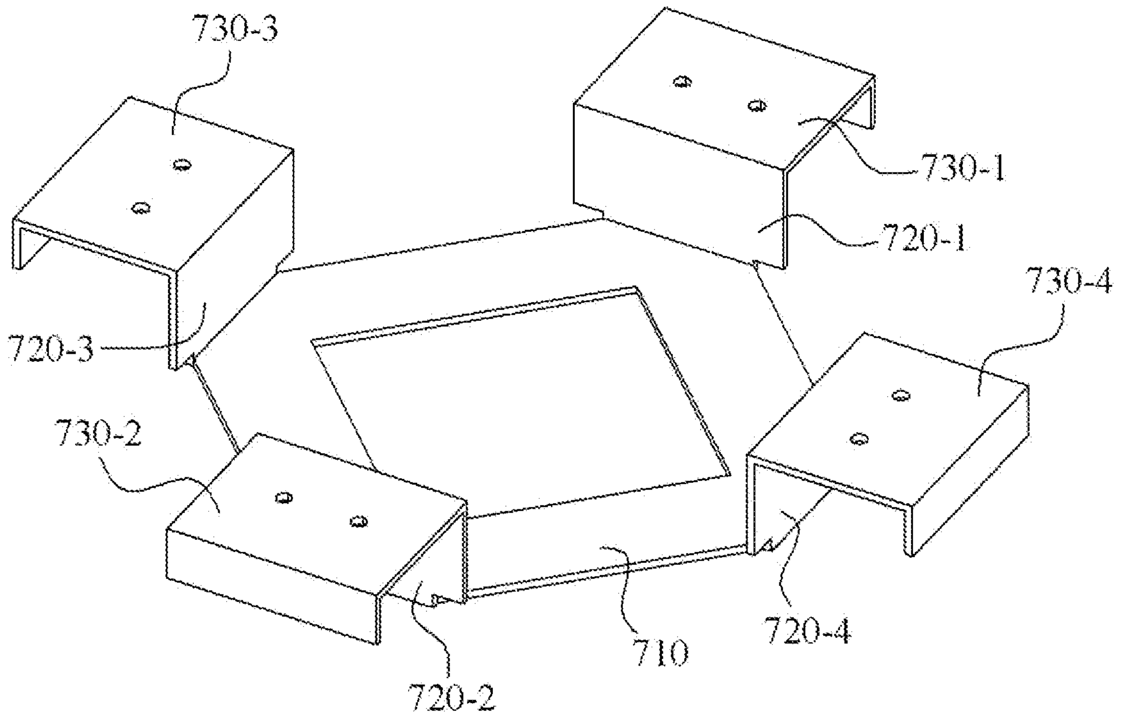
FIG. 9 is a perspective view showing a structure of a metal coupler according to an embodiment of the present disclosure.

FIG. 9 is a perspective view showing a structure of a metal coupler according to an embodiment of the present disclosure.

Referring to FIG. 9, the metal coupler 700 according to an embodiment of the present disclosure may include a ring-shaped patch portion 710 with a slot formed in the center, a plurality of supporters 720-1, 720-2, 720-3 and 720-4 protruding upward from the ring-shaped patch portion 710, and a plurality of coupling patches 730-1, 730-2, 730-3 and 730-4 extending from each of the plurality of supporters 720-1, 702-2, 720-3 and 720-4. The ring-shaped patch portion 710, the supporters and the coupling patches constituting the metal coupler 700 are made of the same material, and are made of a metal material.

The two substrates 800*a* and 800*b* forming the balun unit 800 pass through the slot formed in the center of the ring-shaped patch portion 710.

Four supporters 720-1, 720-2, 720-3 and 720-4 protrude from the ring-shaped patch portion 710 in a vertical direction. According to a preferred embodiment of the present disclosure, the number of supporters and the number of coupling patches are determined based on the number of dipole arms. In this embodiment, since four dipole arms 510-1, 510-2, 520-1 and 520-2 are used, four supporters 720-1, 720-2, 720-3 and 720-4 are formed.

The coupling patches 730-1, 730-2, 730-3 and 730-4 extend from the plurality of supporters 720-1, 720-2, 720-3, and 720-4, respectively. The coupling patches 730-1, 730-2, 730-3 and 730-4 extend perpendicular to the protruding direction of the supporter, and thus extend in a direction parallel to the radiation substrate 500.

According to a preferred embodiment of the present disclosure, the first coupling patch 730-1 extends in the same direction as the first+dipole arm 510-1, the second coupling patch 730-2 extends in the same direction as the first−dipole arm 510-2, the third coupling patch 730-3 extends in the same direction as the second+dipole arm 520-1, and the fourth coupling patch 730-4 extends in the same direction as the second−dipole arm 520-2.

Ends of the plurality of coupling patches 730-1, 730-2, 730-3 and 730-4 may be vertically bent, and such a vertical bending structure is not necessarily required.

Each of the coupling patches is coupled to the lower portion of the substrate, and electromagnetic coupling occurs with adjacent dipole arms disposed on the upper portion of the substrate. The first coupling patch 730-1 vertically overlaps the first+dipole arm 510-1 to generate electromagnetic coupling with the first+dipole arm. The second coupling patch 730-2 vertically overlaps the first−dipole arm 510-2 to generate electromagnetic coupling with the first−dipole arm. Such electrical coupling occurs in the same way for the third coupling patch 730-3 and the fourth coupling patch 730-4.

Current generated through electromagnetic coupling in the coupling patches flows to the ring-shaped patch portion 710 through the supporter.

The metal coupler 700 having the structure described above plays a role of blocking the signal induced by the high-band radiator with high impedance through coupling with the dipole arms, thereby improving isolation between the low-band radiator and the high-band radiator and improving the cross-polarization ratio of the low-band radiator.

While the present disclosure is described with reference to embodiments illustrated in the drawings, these are provided as examples only, and the person having ordinary skill in the art would understand that many variations and other equivalent embodiments can be derived from the embodiments described herein.

What is claimed is:

1. A multi-band base station antenna, comprising:
- a reflector;
- a plurality of high-band radiators arranged on the reflector; and
- a plurality of low-band radiators arranged on the reflector,
- wherein each of the plurality of low-band radiators comprises:
- a radiation substrate;
- a first dipole radiator including a first+dipole arm and a first−dipole arm formed on the radiation substrate;
- a second dipole radiator including a second+dipole arm and a second−dipole arm formed on the radiation substrate; and
- a metal coupler coupled to a lower portion of the radiation substrate, and
- wherein the metal coupler comprises: a first coupling patch located below the first+dipole arm; a second coupling patch located below the first−dipole arm; a third coupling patch located below the second+dipole arm; a fourth coupling patch located below the second−dipole arm; a ring-shaped patch portion with a slot formed in the center; and first to fourth supporters vertically protruding from the ring-shaped patch portion, and
- wherein each of the first to fourth coupling patches is coupled to the first to fourth supporters, respectively.

2. The multi-band base station antenna according to claim 1, wherein the low-band radiators further comprise a balun unit that performs impedance matching and provides a feed signal, wherein the balun unit passes through the slot and is coupled to the radiation substrate.

3. The multi-band base station antenna according to claim 1, wherein the low-band radiators further comprise:

a first+coupling arm formed on the lower portion of the radiation substrate and formed at a position where electromagnetic coupling is possible with the first+ dipole arm;

a first−coupling arm formed on the lower portion of the radiation substrate and formed at a position where electromagnetic coupling with the first−dipole arm is possible;

a second+coupling arm formed on the lower portion of the radiation substrate and formed at a position where electromagnetic coupling with the second+dipole arm is possible; and a second−coupling arm formed on the lower portion of the radiation substrate and formed at a position where electromagnetic coupling with the second−dipole arm is possible.

4. The multi-band base station antenna according to claim 3, wherein the first+coupling arm, the first−coupling arm, the second+coupling arm and the second−coupling arm extend in a direction rotated by a predetermined angle compared to an extension direction of each of the first+dipole arm, the first−dipole arm, the second+ dipole arm and the second−dipole arm.

5. The multi-band base station antenna according to claim 4, wherein the rotated direction is a direction away from the high-band radiators.

6. The multi-band base station antenna according to claim 3, wherein, on an upper portion of the radiation substrate, a plurality of auxiliary arms are formed between the first dipole radiator and the second dipole radiator.

7. The multi-band base station antenna according to claim 6, wherein, on the lower portion of the radiation substrate, a plurality of coupling auxiliary arms are formed at positions where electromagnetic coupling with each of the plurality of auxiliary arms is possible.

8. A multi-band base station antenna, comprising:

a reflector;

a plurality of high-band radiators arranged on the reflector; and a plurality of low-band radiators arranged on the reflector, wherein each of the plurality of low-band radiators comprises:

a radiation substrate;

a first dipole radiator including a first+dipole arm and a first−dipole arm formed on the radiation substrate;

a second dipole radiator including a second+dipole arm and a second−dipole arm formed on the radiation substrate;

a first+coupling arm formed on a lower portion of the radiation substrate and formed at a position where electromagnetic coupling is possible with the first+ dipole arm;

a first−coupling arm formed on the lower portion of the radiation substrate and formed at a position where electromagnetic coupling with the first−dipole arm is possible;

a second+coupling arm formed on the lower portion of the radiation substrate and formed at a position where electromagnetic coupling with the second+dipole arm is possible; and a second−coupling arm formed on the lower portion of the radiation substrate and formed at a position where electromagnetic coupling with the second−dipole arm is possible; and wherein the first+coupling arm, the first−coupling arm, the second+coupling arm and the second−coupling arm extend in a direction rotated by a predetermined angle compared to an extension direction of each of the first+dipole arm, the first−dipole arm, the second+ dipole arm and the second−dipole arm;

wherein each of the plurality of low-band radiators comprise a metal coupler coupled to the lower portion of the radiation substrate, and wherein the metal coupler comprises: a first coupling patch located below the first+dipole arm; a second coupling patch located below the first−dipole arm; a third coupling patch located below the second+dipole arm; and a fourth coupling patch located below the second−dipole arm.

9. The multi-band base station antenna according to claim 8, wherein the metal coupler further comprises:

a ring-shaped patch portion with a slot formed in the center; and first to fourth supporters vertically protruding from the ring-shaped patch portion, wherein each of the first to fourth coupling patches is coupled to the first to fourth supporters, respectively.

10. The multi-band base station antenna according to claim 9, wherein the low-band radiators further comprise a balun unit that performs impedance matching and provides a feed signal, wherein the balun unit passes through the slot and is coupled to the radiation substrate.

11. The multi-band base station antenna according to claim 8, wherein the rotated direction is a direction away from the high-band radiators.

12. The multi-band base station antenna according to claim 8, wherein, on an upper portion of the radiation substrate, a plurality of auxiliary arms are formed between the first dipole radiator and the second dipole radiator.

13. The multi-band base station antenna according to claim 12, wherein, on the lower portion of the radiation substrate, a plurality of coupling auxiliary arms are formed at positions where electromagnetic coupling with each of the plurality of auxiliary arms is possible.

* * * * *